(No Model.)

A. C. DARRAGH.
OIL FILTER.

No. 401,544. Patented Apr. 16, 1889.

WITNESSES:
John H. Kerr
R. C. Wrenshall

INVENTOR.
Albert C. Darragh
BY William L. Pierce
his ATTORNEY.

UNITED STATES PATENT OFFICE.

ALBERT C. DARRAGH, OF ALLEGHENY, PENNSYLVANIA.

OIL-FILTER.

SPECIFICATION forming part of Letters Patent No. 401,544, dated April 16, 1889.

Application filed January 7, 1889. Serial No. 295,642. (No model.)

*To all whom it may concern:*

Be it known that I, ALBERT C. DARRAGH, a citizen of the United States, residing in the city and county of Allegheny, and State of Pennsylvania, have invented or discovered a certain new and useful Improvement in an Oil-Filter, of which improvement the following is a specification.

The purpose of my invention is to construct a simple, inexpensive, and rapid filter for oil or other liquids lighter than water. The filter will also act as a dust-tight reservoir for the filtered oil. It is found to be particularly adapted for filtering the drippings from machinery for reuse. It is also desirable to filter lubricating-oils before any use is made of them, as they frequently contain dust and dirt, injurious to bearings.

Figure 1:
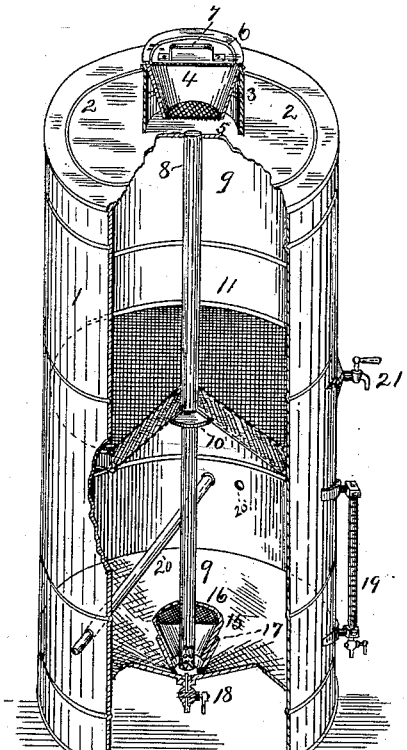
Figure 2:
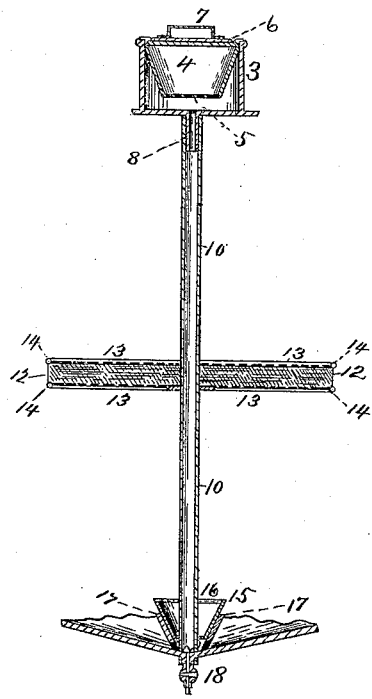

In the accompanying drawings, which make part of this specification, Figure 1 is a perspective view, broken away and partly in section, of my filter. Fig. 2 is a longitudinal central section of the filter.

The filter is composed of the following parts: The shell 1 is preferably made of galvanized iron of varying sizes, according to the amount of oil to be filtered and the rapidity of filtering required. The shell shown in the drawings is about forty-four inches in height and twenty-four inches in diameter. The top 2 2 of the filter is made removable. The receiver 3 is also detachable from the top 2 2 of the filter, and may, if desired, be filled with white waste or other fibrous matter. Inside the receiver is the funnel 4, having at its base a strainer of wire-cloth, 5, preferably sixteen mesh to the inch. The receiver has a lid, 6, with handle 7. From the center of the bottom of the receiver 3, and connected thereto with a tight joint, extends a short pipe-section, 8, into the stand-pipe 9. The latter is a tube (here one and one-half inch in diameter) and extending to the bottom of the shell 1. The stand-pipe 9 is perforated at its lower end, and about midway of its length has a flange, 10, which supports the filter-disk 11. There is also a ledge (not shown) running around the inner circumference of the shell, which also supports the disk 11. As is shown more clearly in Fig. 2, the disk is made of two layers of hair felt, 12, each two inches in thickness, preferably inclosed in a flannel sack.

The upper and lower surfaces of the disk are covered with wire-cloth, 13, of the same mesh as above indicated. The circumference of the disk is stiffened by the wire hoops 14 14.

The parts of the disk are not numbered in Fig. 1 to avoid confusion in the drawings. Instead of using felt in the filter-disk 11, asbestus, white waste, charcoal, bone-dust, and many fibrous or vegetable materials may be used. It will be noted that the disk 11 is free to float upon the stand-pipe 9 as a stem.

The base of the stand-pipe 9 projects into a second funnel, 15, having strainer of wire-cloth, 16, preferably of the fineness above described. The funnel is guided to its seat over the wash-cock 18 by the guide 17 17, which is perforated at its base. The bottom of the filter slopes to its center, to insure perfect drainage.

19 is a water-gage to indicate height and purity of the water.

20 is a steam-pipe to keep water and filtering oil at a proper temperature in cold weather.

21 is a faucet to draw off the oil. The shell 1 of the filter is extended about six or eight inches below the bottom of the filter, and the front of the shell at the bottom is cut away to reach the wash-cock 18 with the hand.

In using my filter the oil is poured in at the funnel 4, passes through the strainer 5 into stand-pipe 9, (which is filled with water from the chamber surrounding it to about an inch below the flange 10,) down the stand-pipe 9 and through its perforations, depositing most of its impurities in the funnel 15, up through the strainer 16 and through the large body of water below the filter-disk 11, and through the filter-disk 11 into the chamber above, where it is stored till needed.

As my filter-disk 11 is very large, being of the same diameter as the shell 1, the filtering is carried on very rapidly.

When it is necessary to clean the filter, all oil can be drawn off by pouring in an excess of water. When the oil has been exhausted, the waste-cock 18 drains off all water and sediment. The top 2 2, with receiver and funnel, is then lifted off and the stand-pipe 9 pulled up, bringing with it the filter-disk and lower funnel, leaving nothing but the guide in the can.

The following parts, while contributing to the efficiency of my invention, are not absolutely indispenable to the result—viz., the funnel in the receiver, the receiver, the pipe-section 8, and the lower funnel, 15, with its strainer. There must be, however, some means for straining the oil before it passes down the stand-pipe 9.

Having fully described my invention, what I desire to secure by Letters Patent is—

In a combined filter and reservoir, the combination of a shell, a receiver containing a funnel with a strainer and having a short pipe-section projecting from its base, a stand-pipe extending from said receiver into a funnel, provided with a strainer at the base of the filter, a guide supporting said funnel, a wash-cock at the bottom of the filter, and a filter-disk forming the bottom of the reservoir and separating said reservoir from the water-chamber, all substantially as and for the purposes set forth.

In testimony whereof I have hereunto set my hand.

ALBERT C. DARRAGH.

Witnesses:
　WM. L. PIERCE,
　JAMES F. ROBB.